(12) United States Patent
Jutzi et al.

(10) Patent No.: US 8,989,804 B2
(45) Date of Patent: Mar. 24, 2015

(54) SYSTEM AND METHOD FOR PROXIMITY-BASED RADIO MANAGEMENT (75) Inventors: Curtis E. Jutzi, Lake Oswego, OR (US); Bhupal De, Kirkland, WA (US)

(73) Assignee: Clearwire IP Holdings LLC, Bellevue, WA (US)

( * ) Notice: Subject to any disclaimer, the term of this patent is extended or adjusted under 35 U.S.C. 154(b) by 802 days.

(21) Appl. No.: 12/610,794

(22) Filed: Nov. 2, 2009

(65) Prior Publication Data

US 2011/0105102 A1    May 5, 2011

(51) Int. Cl.
*H04M 1/00* (2006.01)
*H04W 52/02* (2009.01)
*H04W 8/22* (2009.01)
*H04W 76/02* (2009.01)
*H04W 88/02* (2009.01)
*H04W 88/06* (2009.01)

(52) U.S. Cl.
CPC ............ *H04W 52/0229* (2013.01); *H04W 8/22* (2013.01); *H04W 76/02* (2013.01); *H04W 88/02* (2013.01); *H04W 88/06* (2013.01)
USPC ..................... 455/552.1; 455/435.2; 455/440; 370/254

(58) Field of Classification Search
CPC ..... H04W 88/06; H04W 48/18; H04W 48/16; H04W 84/18; H04W 84/12; H04W 76/02; H04W 28/18; H04W 36/14; H04W 76/028; H04W 4/24; H04W 80/00; H04W 88/02; H04W 88/04; H04W 88/16; H04W 16/26; H04W 28/06; H04W 48/08; H04W 4/06; H04L 41/12; H04L 41/5038; H04L 41/5087; H04L 41/5096; H04L 29/06027; H04L 67/16; H04L 67/306; H04L 65/1069; H04L 29/06; H04L 29/12169; H04L 45/48; H04L 61/1576; H04L 63/083; H04L 63/0853; H04L 65/1083; H04N 1/00204; H04N 1/00291; H04N 1/00352; H04N 1/00384; H04N 1/00392; H04N 1/00408; H04N 1/00413; H04N 1/00493; H04N 1/00496; H04N 2201/0039; H04N 2201/0094; H04N 7/147; H04N 19/00545; H04N 21/42676; H04N 21/4332
USPC .............. 455/436, 439, 442, 553.1, 408, 411, 455/41.2, 422.1, 434, 456.1, 456.5, 525, 455/552.1, 550.1, 519, 67.11; 370/252, 370/328, 338, 254, 310, 312, 331
See application file for complete search history.

(56) References Cited

U.S. PATENT DOCUMENTS 7,363,379 B2 *   4/2008   Tejaswini et al. .............. 709/227
2004/0157609 A1 *   8/2004   Jalloul et al. ................... 455/442

(Continued)

*Primary Examiner* — Golam Sorowar (57) ABSTRACT

A multi-modal wireless communication device contains multiple radios for communication with wireless networks utilizing different communication protocols. When a communication link with a first base station using a first communication protocol is broken, and a communication link established with a second base station, the mobile device stores the communication data related to the prior communication link and stores it in association with the current communication link. At some future time, the mobile device may establish a communication link with the second base station. The mobile device can check the stored data to see if there is a an alternative network connection in the proximity of the current connection. If so, the mobile device may activate the radio for communication with first base station and actively attempt to establish a communication link based on the proximity data recalled from storage in the mobile device.

22 Claims, 6 Drawing Sheets

(56) References Cited

U.S. PATENT DOCUMENTS

| | | | |
|---|---|---|---|
| 2005/0148299 A1* | 7/2005 | Buckley | 455/41.2 |
| 2006/0166693 A1* | 7/2006 | Jeong et al. | 455/525 |
| 2007/0230420 A1* | 10/2007 | Bumiller et al. | 370/338 |
| 2008/0064402 A1* | 3/2008 | Oh | 455/436 |
| 2009/0182895 A1* | 7/2009 | Kruger et al. | 709/239 |
| 2009/0196220 A1* | 8/2009 | Tsuruta et al. | 370/328 |
| 2009/0209267 A1* | 8/2009 | Jagetiya | 455/456.1 |
| 2009/0219833 A1* | 9/2009 | Yaqub et al. | 370/254 |
| 2009/0278705 A1* | 11/2009 | Chhabra et al. | 340/825.49 |

* cited by examiner

| CURRENT CONNECTION | ALTERNATIVE CONNECTIONS |
|---|---|
| CDMA<br>TID      SID<br>106      106.S1 | WiMAX<br>TID    SID    CHANNEL    WIDTH<br>108    108.S1    1    10 |
| CDMA<br>TID      SID<br>106      106.S3 | WiMAX<br>TID    SID    CHANNEL    WIDTH<br>108    108.S3    4    5<br>WiFi<br>MACID      SSID<br>0:1:0:4      SAMPLE _WiFi |
| ≈ | ≈ |
| WiFi<br>MAC      SSID<br>0:1:0:4      SAMPLE_WiFi | WiMAX<br>TID    SID    CHANNEL    WIDTH<br>108    108.S2    5    10<br>108    108.S3    4    5<br>185    185.S1    6    10 |

FIG.6

SYSTEM AND METHOD FOR PROXIMITY-BASED RADIO MANAGEMENT

BACKGROUND OF THE INVENTION

1. Field of the Invention

The present invention is directed generally to radio management and, more particularly, to a system and method for controlling multiple radios within a single device.

2. Description of the Related Art

Wireless communication has evolved from simple single-mode voice communication to highly sophisticated multi-mode communication devices used for voice communication, email, web page access, video download, streaming media transmission and reception, and the like.

While the early single-mode devices contained a single transceiver, modern wireless devices often have multiple transceivers to allow it to communicate using different communication frequencies and/or communication protocols. For example, a wireless device may include a radio for communication with a service provider using Code Division Multiple Access (CDMA) as well as a radio for WiFi communication and yet another radio for WiMAX communication.

If all three communication types are available, a wireless device may have a predetermined or user-selected preference for communication. For example, a wireless device may prefer communication via WiMAX, but will switch to WiFi if WiMAX is unavailable. If neither WiMAX nor WiFi are available, the device may resort to communication using CDMA.

To conserve battery power, a wireless device will turn off unused radios. However, when communicating using a less desired communication protocol, the wireless device may periodically power up the other radios to search for a base station with which to communicate using a more preferred communication protocol. Currently, the operation of multiple radios requires scanning for available radio frequencies for each of these multiple communication protocols. This periodic power-up of multiple radios can result in an undesirable surge in power consumption. For a battery-operated device, this is a drawback. In addition, when a particular transceiver enters into a power-up state, it must sometimes search over a broad range of frequencies to detect possible base stations with which to register. This can cause further undesirable consumption of battery power.

To avoid the undesirable consumption of battery power, some conventional wireless devices use a back-off algorithm when searching for alternative base stations. In a typical back-off algorithm, the wireless device periodically powers up one or more radios to search for a more desirable base station with which to communicate. However, if the wireless device is unable to find a more desirable base station, it will search less and less frequently as time goes on. That is, the wireless device backs off in the frequency with which it searches for more desirable base stations with which to communicate.

While the back-off algorithm may conserve battery power, it may also delay the reacquisition of a more desirable base station with which to communicate. Therefore, it can be appreciated that there is a significant need for a technique that will improve the reacquisition of more preferable base stations. The present disclosure provides this and other advantages, as will be apparent from the following detailed description and accompanying figures.

DETAILED DESCRIPTION OF THE INVENTION

The present disclosure is directed to techniques for the improved detection of wireless communication networks using stored association data. As will be described in greater detail below, a wireless device is configured to store information related to a first base station or access point in association with a second base station or access point in the same proximity as the first base station. At a subsequent point in time, if a user device establishes communication with the second communication network, that stored associated information may allow the wireless device to "look" for the first base station in the alternative network based on the previously determined proximity. Thus, management of the user device and its radios to access alternative networks is based on the proximity of one base station with respect to another. In other words, a user device constructed in accordance with the present teachings may detect the proximity of alternative wireless networks and manage multiple radios based on information from the currently connected infrastructure and use information to develop proximity-based data.

Figure 1:
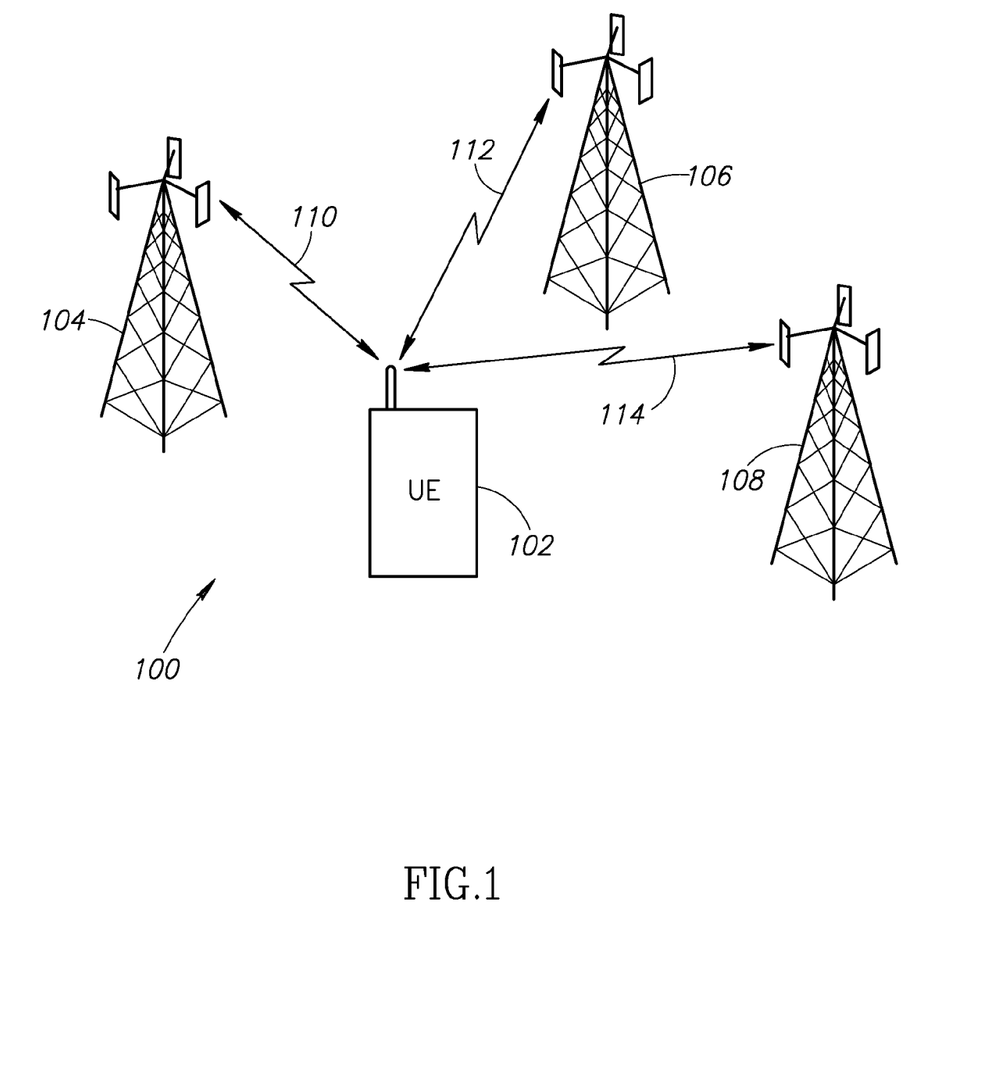
FIG. 1 is a functional block diagram of a communication system constructed in accordance with the present teachings.

The present convention is embodied in a system 100 illustrated in the functional block diagram of FIG. 1. A user equipment (UE) 102 is a multi-mode wireless communication device. While the UE 102 may be illustrated herein as a cell phone device, those skilled in the art will appreciate that the principles disclosed herein are applicable to cell phone devices, personal digital assistants (PDA) devices, personal communication system (PCS) devices, mobile laptop computers or virtually any other wireless device that communicates with a network service provider using a cell-like network.

As illustrated in FIG. 1, the UE 102 may communicate with base stations 104-108 via wireless communication links 110-114, respectively. Those skilled in the art will appreciate that a typical wireless communication network has many more base stations and many more users coupled to each base station. However, for the sake of clarity, FIG. 1 illustrates only the single UE 102 and the three base stations 104-108, each on separate wireless networks.

As will be described in greater detail below, the base stations 104-108 may each communicate with the UE 102 utilizing a different communication protocol on different wireless networks. For example, the base station 104 may communicate with the UE 102 via the wireless communication link 110 using a WiFi communication protocol. Similarly, the UE 102 may communicate with the base station 106 via the wireless communication link 112 using a CDMA communication protocol. Finally, the UE 102 may communicate with the base station 108 via the wireless communication link 114 using a WiMAX communication protocol. Connectivity between the UE 102 and the various base stations may be based on conventional communication standards, such as IEEE 802.16e or 802.11.

Those skilled in the art should appreciate that the three communication protocols illustrated in the exemplary embodiment of FIG. 1 are merely representative of the different types of communication links that may be established with UE 102. The system 100 is not limited by a specific communication protocol. For example, one of the base stations 104-108 could communicate with the UE 102 using a GSM communication protocol or other type of communication protocol or networks. Furthermore, it should be understood that the base stations 104-108 may be part of a single wireless communication network provided by a single service provider. However, the system 100 may readily be implemented using communication networks of multiple different service providers. For example, the base station 104 and base station 108 may provide WiFi and WiMAX communication services provided by a single service provider. In this example, the base station 106 may provide CDMA communication services using a second network service provider. Thus, the system 100 may be implemented with the communication services provided by one or more network service providers. Finally, FIG. 1 illustrates the base stations 104-108 as geographically spaced apart base stations. However, it is possible that a single base station tower may include the necessary hardware to support multiple communication protocols and networks from one or more service providers. For example, the base station 106 may be configured to provide both CDMA communication services and may further provide WiMAX communication services. These two separate communication services may be provided by a single network service provider or multiple different service providers. Thus, the system 100 is not limited by the specific communication protocols, the number of network service providers, and may include geographically separate or co-located base stations.

Figure 2:
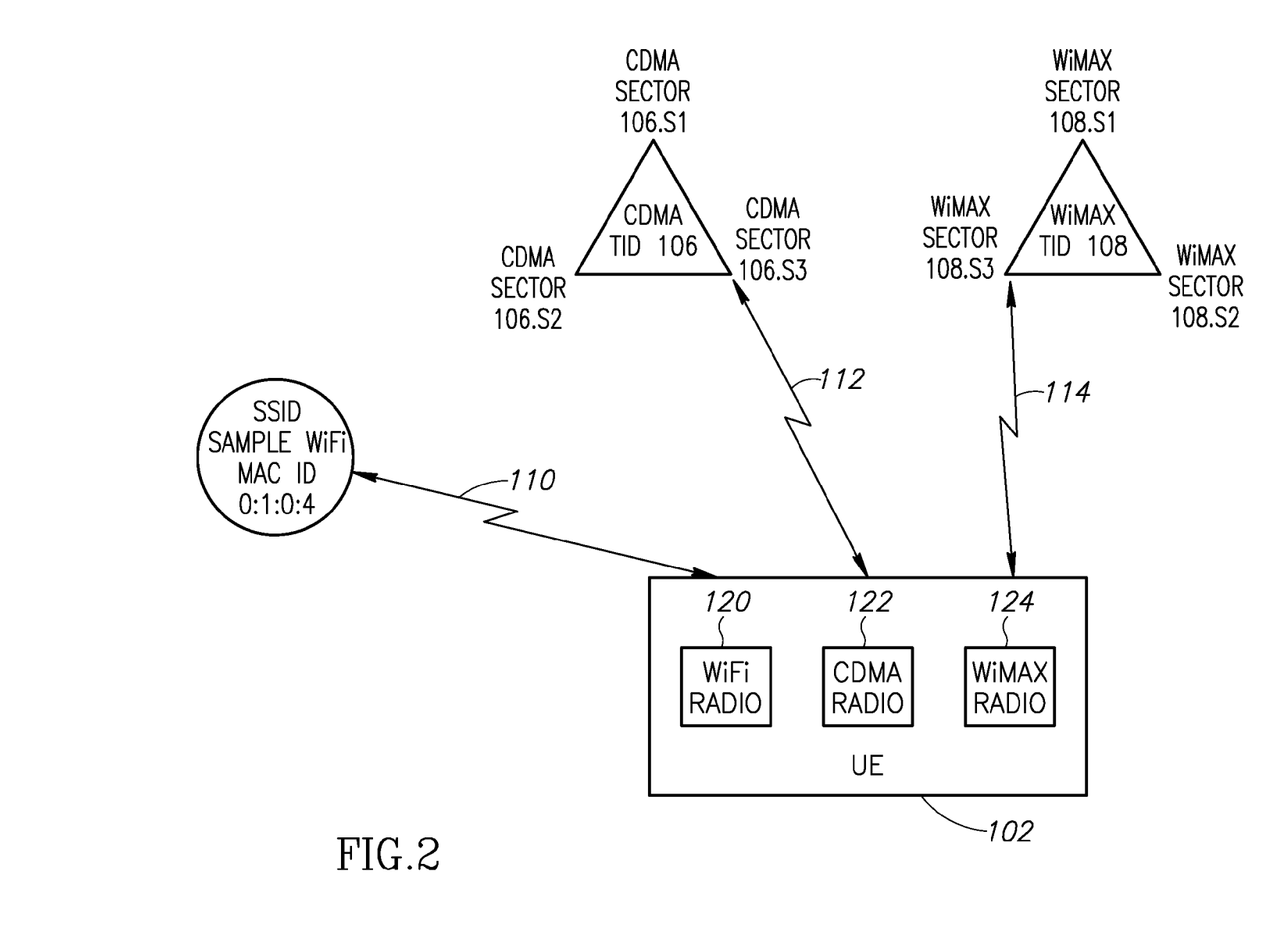
FIG. 2 is a diagram of the communication system of FIG. 1 with additional details.

FIG. 2 provides further details of the example embodiment of FIG. 1. In FIG. 2, the UE 102 is illustrated as having three separate radios 120-124. In this example embodiment, a WiFi radio 120 supports WiFi communications, a CDMA radio 122 supports CDMA communications and a WiMAX radio 124 supports WiMAX communications. Those skilled in the art will appreciate that the radios 120-124 include both transmitter and transceiver components, typically implemented as a transceiver, as well as the necessary modulation/demodulation and other control circuitry. The communication standards for each of these exemplary communication protocols are well understood and need not be described in greater detail herein. Similarly, other communication protocols, such as GSM, 4G, wCDMA, and the like, may be used. These protocols are also well understood and need not be described in greater detail herein.

As illustrated in FIG. 2, the WiFi radio 120 is in range of and can communicate with the base station 104 via the wireless communication link 110. In this embodiment, the base station 104 is identified by a Media Access Control (MAC) identification, which uniquely identifies the device and a Service Set Identifier (SSID), which is a network name assigned to a local area network (LAN). A WiFi base station is often implemented with an omni-directional antenna with a generally circular coverage pattern rather than sectored coverage patterns that are more typical of a cellular network. For this reason, FIG. 2 illustrates the base station 104 as a circle to indicate the omni-directional coverage pattern. In contrast, the base stations 106 and 108 are illustrated in FIG. 2 as triangles to indicate the sectored coverage pattern (3 sectors in the example illustrated in FIG. 2).

In addition, the CDMA radio 122 is in range of and can communicate with a particular sector of the base station 106. Those skilled in the art will appreciate that that a typical base station has a coverage area that may be subdivided into different communication sectors. Each sector of the base station has its own radios and control circuitry. In the example of FIG. 2, the CDMA radio 122 communicates via the wireless communication link 112 with the CDMA Sector 3 of the base station 106. In this example, the identification data associated with the base station 106 include tower identification (TID) of 106 as well as the sector identification (SID) of 106.S3.

Finally, the WiMAX radio 124 is in range of and can communicate with a specific sector of the base station 108. Specifically, the WiMAX radio 124 communicates via the wireless communication link 114 with Sector 3 of the base station 108. The base station 108 has a TID of 108 and a sector identification information of WiMAX Sector 108.S3. Those skilled in the art will appreciate that the UE 102 may be capable of communicating with all three base station simultaneously. This depends on factors such as the proximity to the respective base stations, interfering structures such as natural terrain (e.g., mountains, valleys, and trees) as well as man-made structures (e.g., buildings). Although the UE 102 may be capable of communicating with all three base stations 104-108, there is usually a hierarchy in the selection of preferred communication protocols. The UE 102 may have preferred communication protocols based on operational costs, data computational efficiency, data transfer rates and the like.

For example, the UE 102 may be preprogrammed by the service provider or via user selection, to preferentially communicate using a WiMAX communication protocol. Thus, in the example of FIG. 2, the UE 102 may default to activate the WiMAX radio 124 and attempt to register with the base station 108. If communication with a WiMAX base station is not possible, the UE 102 may default, in the example of FIG. 2, to communication using the WiFi communication protocol. In this example, the UE 102 would activate the WiFi radio 120 and attempt a registration process with the base station 104. In the event that the UE 102 cannot communicate using the WiMAX or WiFi communication protocols, the CDMA radio 122 may be activated to establish a communication link (e.g., the communication link 112) to permit the UE 102 to communicate with the CDMA base station 106.

Using this example of preference hierarchy, the UE 102 will initially attempt to communicate with the base station 108 using the WiMAX communication protocol. If, at some time, the wireless communication link 114 is broken and no other base stations on that network are within range, the UE 102 will then attempt to establish a communication link with a different WiMAX base station or a different sector of the WiMAX base station 108. If a communication link cannot be established using the WiMAX communication protocol, the UE 102 may attempt to establish a communication link using another communication protocol.

In accordance with the present teachings, when a communication link is broken and a subsequent communication link is established, the UE 102 will store "proximity data" related to the just-terminated communication link. That is, the connection information from a just-terminated communication link may be stored in connection with a just-established communication link. This stored data is indicative of an alternative network communication link in geographic proximity with the current communication link. At some later point in time, when the UE 102 may register with a base station using a less desired communication protocol, the UE 102 may have stored data related to an alternative network in proximity with the current connection. That prior proximity connection data can be used by the UE 102 to re-establish the preferred communication link.

Figure 3:
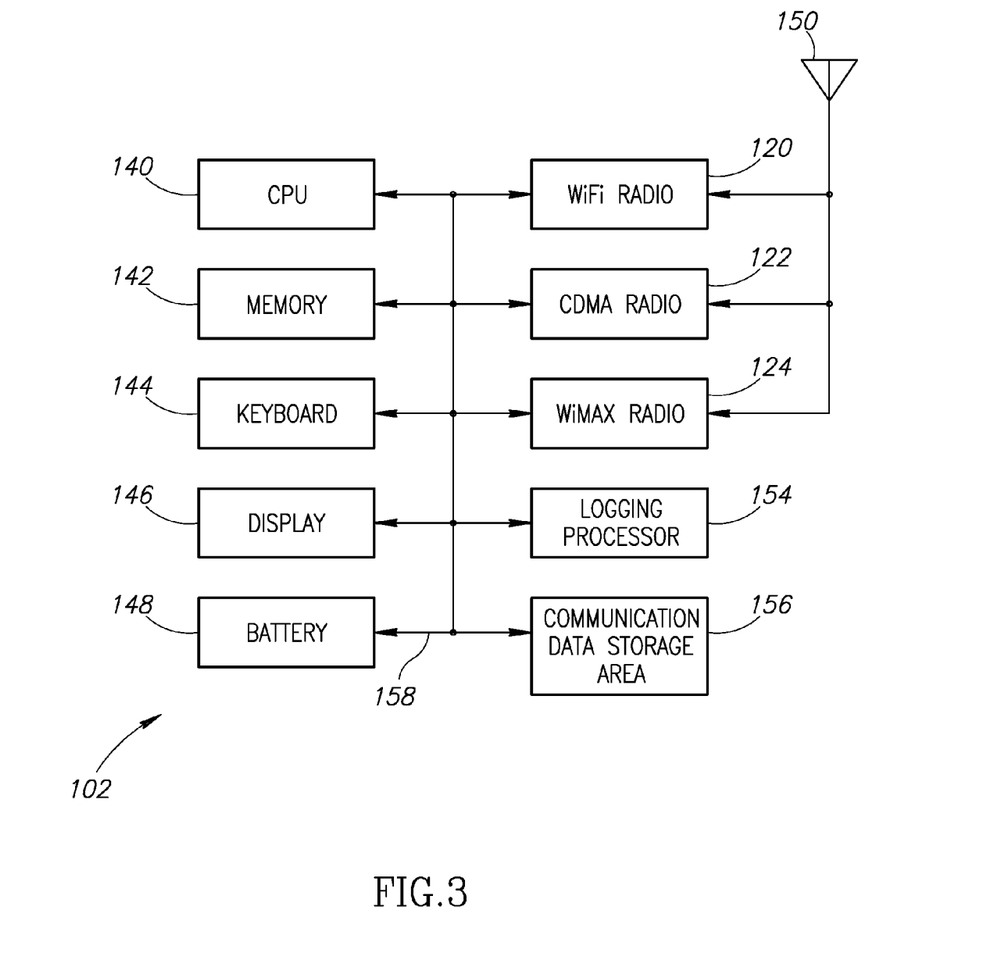
FIG. 3 is a functional block diagram of user equipment constructed in accordance with the present teachings.

FIG. 3 is a functional block diagram of the UE 102. The UE 102 includes a central processing unit (CPU) 140 and a memory 142. In general, the memory 142 stores instructions and data to be executed by the CPU 140. The CPU 140 may be implemented using a variety of known technologies. The CPU 140 may be a conventional microprocessor, microcontroller, application specific integrated circuit (ASIC), programmable gate array (PGA), digital signal processor (DSP), discrete circuit, or the like. The UE 102 is not limited buy the specific implementation of the CPU 140.

Similarly, the memory 142 may be implemented using a variety of known technologies. The memory 142 may comprise random access memory, read only memory, flash memory, non-volatile memory, or a combination of the above. In one embodiment, a portion of the memory 142 may be implemented integrally with the CPU 140. The UE 102 is not limited by the specific form of type of circuitry used to implement the memory 142.

The UE 102 may also include conventional components, such as a keyboard 144, a display 146, and a battery 248. The battery 148 supplies power to the UE 102. In a typical embodiment, the battery 148 is implemented as a rechargeable battery. The battery 148 may be implemented by any of the numerous known battery technologies. Other components, such as a speaker, microphone, camera, and the like may also be included in the UE 102. For the sake of brevity, these conventional components are not illustrated in FIG. 3.

FIG. 3 also illustrates the WiFi radio 120, CDMA radio 122 and WiMAX radio 124. Although illustrated as separate radios 120-124, those skilled in the art will appreciate that the radios may have common circuitry components. Each of these radios includes the necessary control circuitry to establish communication link using the respective communication protocol and to transmit and receive data in accordance with that communication protocol. Thus, each of the radios 120-124 includes a transmitter and receiver as well as other conventional components, such as coding and decoding (CODEC) circuitry, power control circuitry, and the like, each operating in accordance with the respective communication protocols.

As discussed above, these communication protocols are well known in the art, and need not be described in greater detail herein. Furthermore, as previously discussed, the radios 120-124 shown in the example of FIG. 3 may include other types of radios constructed in accordance with different communication protocols, such as GSM, 4G, wCDMA, and the like. The UE 102 is not limited by the number of different radios or by the specific communication protocols implemented by those radios.

The radios 120-124 are coupled to an antenna system 150. Those skilled in the art will appreciate that the radios 120-124 may utilize a single antenna or may each have its own custom antenna. These are each represented diagrammatically in FIG. 3 by the antenna system 150.

FIG. 3 also illustrates a logging processor 154 and a communication data storage area 156. As will be described in greater detail below, the logging processor 154 logs communication data related to one base station connection and stores it in association with connection information for the current base station information.

The various components illustrated in FIG. 3 are coupled together by a bus system 154. The bus system 154 may include a data bus, address bus, control bus, power bus, and the like. For the sake of clarity, those various buses are illustrated in FIG. 3 as the bus system 154. It should be further noted that some components illustrated in the functional block diagram of FIG. 3 may be implemented by instructions stored in the memory 142 and executed by the CPU 140. For example, the logging processor 154 may be a series of instructions stored in the memory 142 and executed by the CPU 140. Similarly, the communication data storage area 156 may be implemented as part of the memory 142.

The operation of the logging processor 154 and communication data storage area 156 may now be explained in greater detail. In the example of FIG. 2, if the UE 102 is communicating with the base station 108 using the WiMAX communication protocol, the logging processor 154 has the information regarding the base station identification (i.e., TID 108) and the particular sector of the base station (i.e., WiMAX Sector 108.S3) related to the wireless communication link 114. The wireless communication link 114 may be disrupted, such as would occur if the UE 102 is mobile and moves out of range of the base station 108. Upon registration of the UE 102 with a different base station, the logging processor 154 records the communication data related to the wireless communication link 114 and stores it in association with the new base station communication data. For example, the UE 102 may establish the wireless communication link 112 to communicate with the CDMA base station 106. In the example illustrated in FIG. 2, the logging processor 154 records the base station identification (i.e., TID 106) and the sector (i.e., CDMA Sector 106.S3). The logging processor 154 then stores the communication data related to the wireless communication link 114 (e.g., TID 108, WiMAX Sector 108.S3) in association with the data from the wireless communication link 112. In effect, the data for the wireless communication link 112 serves as an index to retrieve the data related to the wireless communication link 114. This data is stored in the communication data storage area 156.

At some subsequent time, if the UE 102 establishes a wireless communication link with the same CDMA base station and sector (i.e., TID 106 and CDMA Sector 106.S3), the logging processor 154 will examine the data in the communication data storage area 156 to determine whether any prior communication data is stored in association with that current communication link. In the example presented herein, the logging processor 154 uses the information for the wireless communication link 112 as an index to retrieve the communication data related to the wireless communication link 114 from the data communication storage area 156. In other words, the UE 102 knows that when the prior communication link 112 was initially established, it replaced the more desirable wireless communication link 114 in the same geographic proximity. Upon establishment of the wireless communication link 112 at some future time, the UE 102 can use the logged data (i.e., proximity data) from the communication data storage area 156 to determine that it is in a region where it may be possible to reestablish the wireless communication link 114. Using the stored communication data related to the wireless communication link 114, the UE 102 can activate the WiMAX radio 124 in an attempt to establish a communication link with the base station 108. Thus, the UE 102 may effectively use this associated data to more quickly identify known possible communication links in proximity with the infrastructure for the current connection rather than periodically activating the various radios and searching for unknown base stations.

Figure 4:
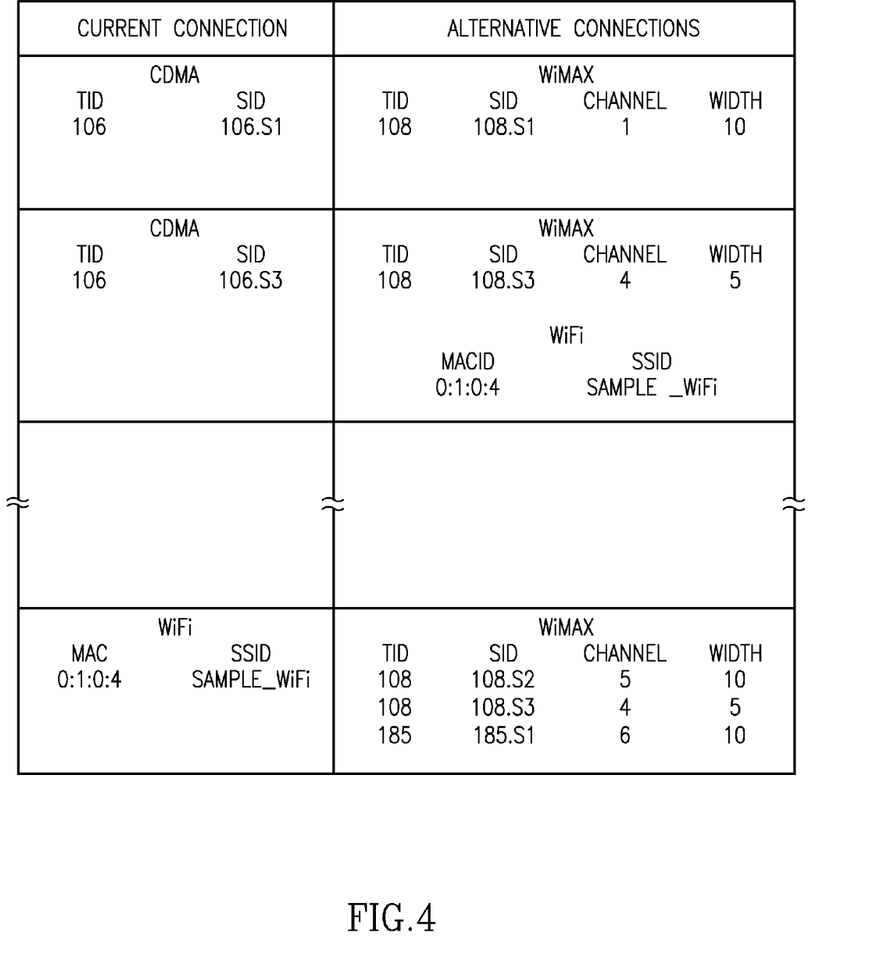
FIG. 4 illustrates sample proximity data used to configure one or more radios within a mobile device.

FIG. 4 illustrates an example of a data table or other data storage arrangement in which proximity data may be stored in the communication data storage area 156. In one column of the data table in FIG. 4, the current connection data is listed. In another column, stored in association with the current connection data is a list of one or more preferred or alternative connections that are in proximity with the infrastructure for the current connection. As previously discussed, the data in the example data table is created when a preferred connection is broken and a less preferred connection is established. That less preferred connection is entered into the data table as the "current connection" while the logged data for the preferred connection is stored in the data table in association with that current connection. In this manner, at some future point in time when the UE 102 establishes a connection with a less preferred communication protocol, the logging processor 154 may look to see if that less preferred connection is stored in the data table. If so, this means that one or more preferred connections are in the same proximity. Thus, the UE 102 may activate the radio for the preferred communication protocol and selectively search for the specific connection.

In one example of proximity data stored in the communication data storage area 156, FIG. 4 illustrates current connection data for the CDMA base station 106. Specifically, the current connection data indicates a TID of 106 and an SID of 106.S1. Stored in association with the current connection data is preferred connection data for a WiMAX connection. Specifically, FIG. 4 illustrates a WiMAX connection having a TID of 108 and an SID of 108.S1.

Whenever the UE establishes a communication link with the TID 106 and the SID 106.S1, the UE 102 can activate the WiMAX radio 124 (see FIG. 3) and attempt to establish a communication link with the WiMAX base station 108 having a TID of 108 and an SID of 108.S1 because the UE 102 knows that this connection had been previously established in the same geographic proximity as the current connection.

The data in FIG. 4 contains the channel number of the prior connection as well as the channel width for the prior connection. This information may be used to configure the WiMAX radio 124. Other forms of data, such as power settings, data rates, and the like may also be stored in the communication data storage area 156 and used to configure the selected radio in the UE 102.

In another example of proximity data in the communication data storage area 156, FIG. 4 illustrates current connection data for the CDMA base station 106. Specifically, the current connection data indicates a TID of 106 and an SID of 106.S3. Stored in association with the current connection data are preferred connection data for both a WiMAX connection and a WiFi connection. Specifically, Figure illustrates a WiMAX connection having a TID of 108 and an SID of 108.S3 as well as data indicating the channel number and channel width of that connection. Because the WiMAX connection is preferred over the WiFi connection in the present example, the UE 102 will activate the WiMAX radio 124 in an attempt to establish a communication link with the WiMAX base station whose connection data is stored in the communication data storage area 156 in association with the current connection data.

If the attempt at connecting to the WiMAX base station 108 fails, the UE 102 may disable the WiMAX radio 124 and enable the WiFi radio 120 in an attempt to connect to the WiFi base station 104. Specifically, the WiFi radio 120 will attempt to establish a communication link with the WiFi base station having a MAC ID of 0:1:0:4 and an SSID of "Sample_WiFi". Thus, the UE 102 selectively activates radios to try to establish a specific communication connection based on the proximity data in the communication data storage area 156.

In yet another example illustrated in the data table of FIG. 4, a WiFi connection having a MAC ID of 0:1:0:4 and an SSID of "Sample_WiFi" includes preferred connection data for a plurality of other connections. This includes connections for the base station 108 having the TID 108 and an SID of 108.S2 as well as an SID of 108.S3. In addition, a preferred connection may be established with another base station (not shown) having a TID of 185 and an SID of 185.S1.

The proximity data is also useful for identifying alternative networks in frequently visited geographic areas. For example, if the user of the UE 102 regularly travels from home to work, the UE 102 will develop proximity data for both a home geographic region and a work geographic region. The user of the UE 102 may prefer to connect to a WiFi base station (e.g., the WiFi base station 104) provided by the user's employer. In this example, the UE 102 will store the proximity data for the employer's base station in association, by way of example, a nearby CDMA base station (e.g., the CDMA base station 106). In this manner, as the UE 102 approaches the work location and registers with the CDMA base station 106, the UE 102 retrieves the proximity data associated with that CDMA base station and now knows that it is in the proximity of the work geographic region and that the employer WiFi base station may now be available. Thus, the UE 102 can detect the presence of the preferred WiFi base station. In one embodiment, the UE 102 may automatically register with the employer WiFi base station based on user-selected preferences. Alternatively, the UE 102 may provide a notification to the user that alternative networks are available and allow the user to manually select a preferred base station with which to register.

In this same example, as the user of the UE 102 returns to the home geographic region, the stored proximity data may be used to reestablish preferred communication links in the user's home geographic region. That is, registration with a base station having proximity data stored in the data communication storage area 156, will trigger an attempt to register with a more preferred or alternative wireless network based on the stored proximity data.

Figure 5:
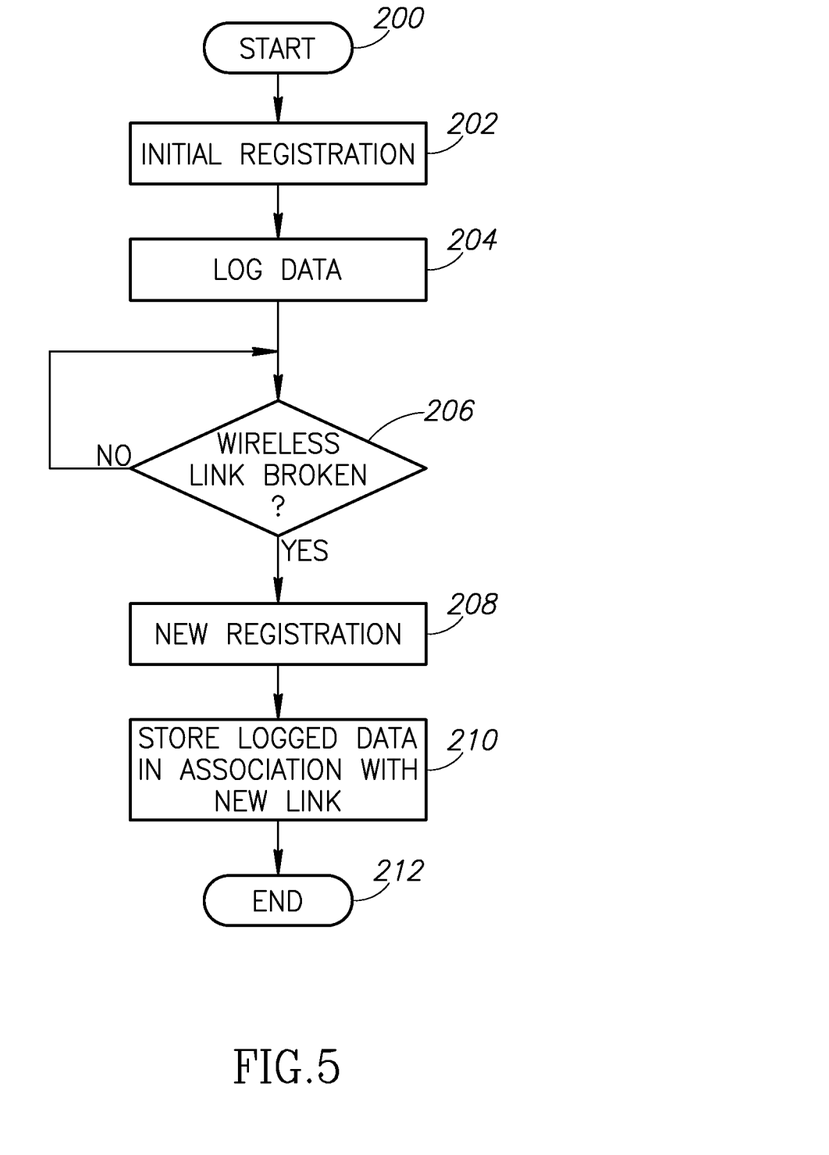
FIG. 5 is a flowchart illustrating an exemplary operation of the wireless device of FIG. 3 in logging data.

FIG. 5 is a flowchart illustrating the operating of the UE 102 to generate and store logging data. At a start 200, the UE 102 has multiple radios and, typically, will have a hierarchy of preferred communication protocols. For example, the UE 102 may have a preference for WiMAX communication protocol, followed by WiFi protocol, followed by CDMA communication protocol. The hierarchical preference of communication protocols may be selected by the network service provider with whom the user of the UE 102 ahs a service contract or, alternatively, may be user-selected.

At step 202, the UE performs an initial registration process. For the sake of the present discussion, it will be assumed that the registration is with the preferred communication protocol and that no data is stored in the communication data storage area 156. Using the example of FIG. 2, the UE 102 establishes the wireless communication link 114 between the WiMAX radio 124 and the WiMAX base station 108. Specifically, the wireless communication link is with the third sector of the WiMAX base station 108 (i.e., TID 108 WiMAX, Sector 108.S3).

In step 204, the logging processor 154 is provided with the communication data related to the wireless communication link. For example, the logging processor 154 may log the power identification (i.e., TID 108) and the sector information (i.e., WiMAX Sector 108.S3). Other communication parameters, such as power, frequency, bandwidth and the like may also be provided to the logging processor 154.

In decision 206, the UE determines whether the wireless link 114 has been broken. If the wireless link 114 is still operational, the result of decision 206 is NO and the UE 102 continues to monitor the wireless communication link 114.

If the wireless communication link 114 is broken, the result of decision 206 is YES. As noted above, the wireless communication link 114 may be broken due to factors such as movement of the UE 102 with respect to the base station 108. Radio interference, poor weather conditions and the like may also cause the degradation of the wireless communication link 114, making it unacceptable for communication between the UE 102 and the base station 108.

No matter what the cause, if the wireless communication link 114 is broken, the UE 102 will attempt a new registration. The UE 102 may perform a registration process with another sector of the WiMAX base station 108. For example, the UE 102 may reregister with the WiMAX base station 108 using the WiMAX Sector 108.S2. Because the new wireless communication link is also a preferred communication protocol, the logging processor 154 may, in one embodiment, not store the logged data from step 204 associated with the wireless communication link 114. Alternatively, if the new registration is with a preferred provider, such as WiMAX Sector 108.S2, or a less preferred provider, such as the CDMA base station 106, the logging processor 154 stores the logged data in step 210. Those skilled in the art will appreciate that the logging processor 154 can perform additional steps, such as checking to see if the data already exists in the communication data storage area 156, to avoid storing the same data again.

In step 210, the logged data that is stored is related to the wireless communication link 114, as described above with respect to step 204. This data related to the wireless communication link 114 is stored in the communication data storage area 156 in association with the new wireless communication link. In the example illustrated in FIG. 2, if the new registration process performed in step 208 establishes the wireless communication link 112 between the CDMA radio 122 and sector 3 of the CDMA base station 106, the data stored in step 210 will use the CDMA identification data as a form of index with which to store and retrieve data associated with the alternative wireless communication link 114. The process ends at step 212 with the logging processor 154 having stored data related to the wireless communication link 114 in the communication data storage area 156 in association with the CDMA Sector 106.S3.

Figure 6:
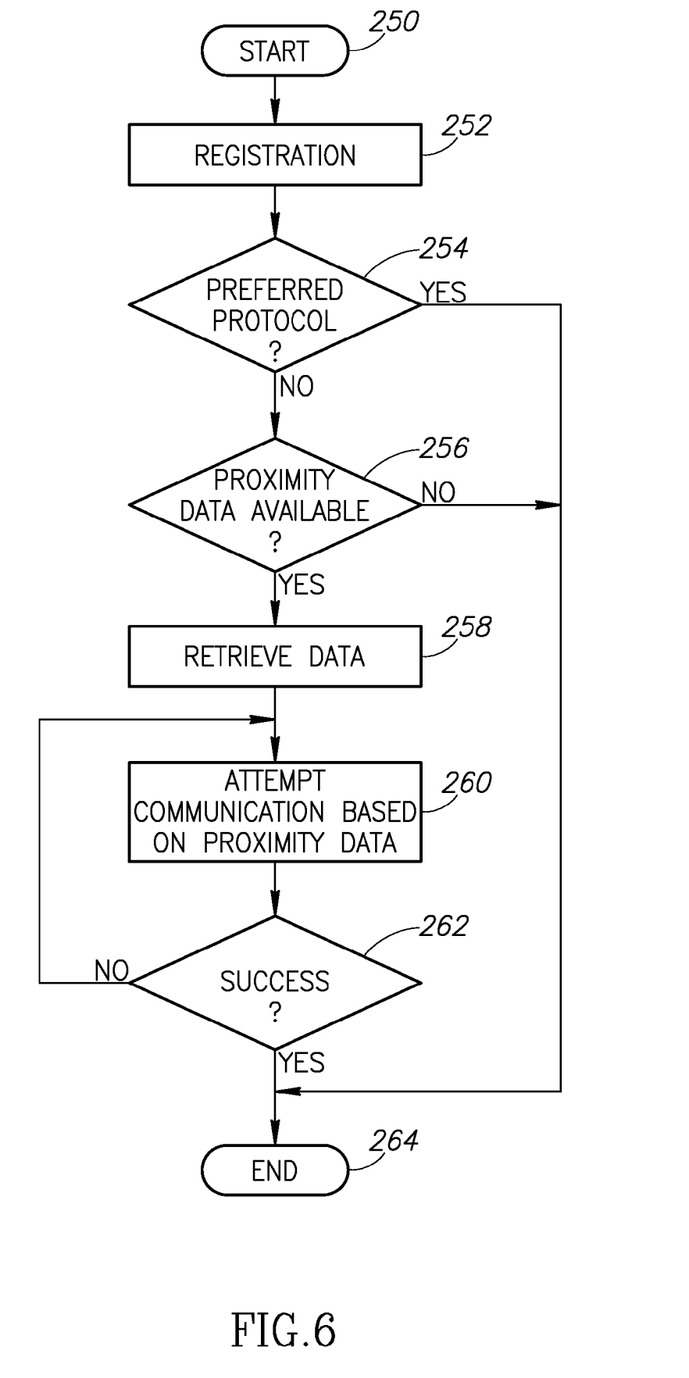
FIG. 6 is a flowchart illustrating an exemplary operation of the wireless device of FIG. 3 to retrieve and use logged data.

FIG. 6 illustrates the operation of the UE 102 to retrieve logged data and use the logged data to reestablish a preferred or alternative wireless communication link. At a start 250, the UE 102 is active and, in step 252, the UE 102 performs a registration process. In decision 254, the UE 102 determines whether the registration performed in step 252 is with a base station utilizing the preferred communication protocol (e.g., the WiMAX communication protocol in the present example). If the new registration is with a base station utilizing the preferred communication protocol, the process ends and communication proceeds in a conventional manner. If the new registration is with a base station not utilizing the preferred communication protocol, the result of decision 254 is NO. In that event, the logging processor 154 queries the communication data storage area 156 to determine whether there is any stored proximity data associated with the current base station (i.e., the base station resulting from the registration process in step 252) to determine if there is any wireless communication link data available from a preferred provider. If there is no data available from a preferred provider, the result of decision 256 is NO. In that event, the process ends and communication proceeds in a conventional manner. If the communication data storage area 156 does have data for a preferred wireless communication link that is stored in association with the current wireless communication link, the result of decision 256 is YES. In that event, the logging processor 154 retrieves the data in step 258 and, in step 260, the UE 102 attempts to register with the base station using the preferred communication protocol. Using the example of FIG. 2, when the registration in step 252 is performed, the CDMA radio 122 establishes the wireless communication link 112 with CDMA Sector 106.S3. As discussed above with respect to the flowchart of FIG. 5, the communication data storage area 156 stored data related to the wireless communication link 114. That data was stored in association with the CDMA Sector 106.S3. In this manner, when the registration process with CDMA Sector 106.S3 is completed in step 252 of FIG. 5, the logging processor 154 determines that data is available for a preferred communication protocol. Thus, the logging processor 154 retrieves data related to the wireless communication link 114.

The WiMAX radio 124 uses this information in a more efficient attempt to establish a communication link with a specific base station. It should be noted that the data for the wireless communication link 114 may specify the WiMAX base station 108 (i.e., TID 108) as well as the WiMAX sector (i.e., WiMAX Sector 108.S3). In an alternative embodiment, data related to the wireless communication link 114 stored in the communication data storage area 156 may be used as a starting point by the WiMAX radio 124 in an attempt to register with the UE 102 using a preferred communication protocol. Thus, the UE 102 may find a stronger signal with a different sector of the WiMAX base station 108. For example, the UE 102 may establish the wireless communication link 114 with WiMAX Section 108.S3.

Returning to FIG. 6, in step 262, the UE 102 determines whether the attempted registration was successful. If the registration attempt using the preferred communication protocol was successful, the result of decision 262 is YES and the process ends at 264. If the attempt was unsuccessful, the result of decision 262 is NO. In that event, the UE 102 may return to step 260 in another attempt to register using the preferred communication protocol. Those skilled in the art will appreciate that the UE 102 may limit the number of times that it will reattempt the re-registration process in step 260 to conserve battery power. The UE 102 may combine the proximity data described above along with back-off techniques in the event that a preferred communication link cannot be established. For example, if the UE 102 has established a communication link with the CDMA base station 106 (see FIG. 2), the proximity data from FIG. 4 indicates that the WiMAX base station 108 is in proximity. The UE 102 may activate the WiMAX radio 124 in an attempt to establish a communication link with the TID 108 and SID 108.S3 on channel 4. In the event that an attempt is unsuccessful, the UE 102 may repeat the attempt some limited number of times, such as, by way of example, three times. If the attempt is unsuccessful, the UE 102 may use back-off technology such that another attempt to register with the base station 108 may be delayed for one minute, by way of example. If the attempt at reactivation of the base station 108 fails after one minute, the back-off value may be increased such that another attempt would not be made for an additional three minutes, by way of example. Those skilled in the art will appreciate that these back-off values are merely illustrative of the back-off process and that specific values may be readily determined by using ordinary engineering skills.

The logging processor 154 (see FIG. 3) may also perform certain housekeeping functions with respect to the communication data storage area 156. For example, old and unused current connection data may be purged from the communication data storage area after a certain period of time, such as 1-2 weeks. This prevents the undesirable accumulation of old data. The logging processor 154 may also arrange the proximity data such that most recently used data is at the top of the list. Those skilled in the art will recognize that the communication data storage area 156 may be configured in any convenient manner, such as a look-up table, database, or the like. The communication data storage area 156 is not limited by the specific form or format in which the proximity data is stored.

The foregoing described embodiments depict different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality.

While particular embodiments of the present invention have been shown and described, it will be obvious to those skilled in the art that, based upon the teachings herein, changes and modifications may be made without departing from this invention and its broader aspects and, therefore, the appended claims are to encompass within their scope all such changes and modifications as are within the true spirit and scope of this invention. Furthermore, it is to be understood that the invention is solely defined by the appended claims. It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations).

Accordingly, the invention is not limited except as by the appended claims.

The invention claimed is:

1. A wireless communication device comprising:
    a first radio configured for communication with a first base station of a first network using a first communication protocol, first base station identification data uniquely identifying the first base station within the first network;
    a second radio configured for communication with a second base station of a second network using a second communication protocol different from the first communication protocol, second base station identification data uniquely identifying the second base station within the second network;
    a data storage area configured to store communication data; and
    a processor configured to:
    establish a communication link between the first radio and the first base station;
    establish a communication link between the second radio and the second base station if the communication link between the first radio and the first base station is broken;
    upon establishing the communication link between the second radio and the second base station, store data related to the communication link between the first radio and the first base station, in association with the second base station identification data, in the data storage area as data related to a past communication link between the first radio and the first base station, the data related to a past communication link comprising the first base station identification data;
    at a subsequent time when the wireless communication device has no communication links established with the first base station or the second base station, establish a communication link between the second radio and the second base station;
    upon establishment of the communication link between the second radio and the second base station, retrieve the data related to the past communication link between the first radio and the first base station;
    activate the first radio while maintaining the communication link between the second radio and the second base station; and
    configure the first radio using the retrieved data to attempt to establish a communication link between the first radio and the first base station using the first communication protocol.

2. The wireless communication device of claim 1 wherein the first base station identification data or the second base station identification data comprises tower identification data and sector identification data.

3. The wireless communication device of claim 1, further comprising a third radio configured for communication with a third base station using a third communication protocol different from the first communication protocol and the second communication protocol, the processor being further configured to:
    store data related to a past communication link between the third radio and the third base station, in association with the second base station identification data, in the data storage area;
    upon establishment of a communication link between the second radio and the second base station, retrieve the data related to a past communication between the first radio and the first base station or the past communication between the third radio and the third base station based on a selection preference to communicate using the first communication protocol or the third communication protocol; and
    selectively activate the first radio or the third radio based on the selection preference while maintaining the communication link between the second radio and the second base station; and
    configure the selectively activated radio using the retrieved data to attempt to establish a communication link between the selectively activated radio and the corresponding base station using the preferred communication protocol.

4. The wireless communication device of claim 3 wherein the first, second, and third communication protocols are selected from a group of communication protocols comprising WiMAX, WiFi, CDMA, GSM, 4G, and wCDMA.

5. The wireless communication device of claim 1 wherein the processor is further configured to delete selected portions of stored data in the data storage area that have not been retrieved for a predetermined length of time.

6. A wireless communication device comprising:
a plurality of radios each configured for communication using a different communication protocol having a hierarchical order of use from a most preferred communication protocol to a least preferred communication protocol, each of the plurality of radios configured to communicate with one or more base stations using the corresponding communication protocol;
a data storage area configured to store communication data; and
a processor configured to:
store data in the data storage area related to past communication links between one of the plurality of radios and a first base station using the most preferred communication protocol, the stored data comprising first base station identification data uniquely identifying the first base station on a first network;
associate the data with second base station identification data from a second base station having a communication protocol other than the most preferred communication protocol, the second base station identification data uniquely identifying the second base station on a second network and being usable as an index for the stored data;
use the index to retrieve the stored data upon establishment of a communication link with the second base station using communication protocols other than the most preferred communication protocol;
activate one of the plurality of radios; and
configure the activated radio using the retrieved data to attempt to establish a communication link between the activated radio and the first base station using the most preferred communication protocol.

7. The wireless communication device of claim 6 wherein the most preferred and the least preferred communication protocols are selected from a group of communication protocols comprising WiMAX, WiFi, CDMA, GSM, 4G, and wCDMA.

8. The wireless communication device of claim 6 wherein the processor is further configured to delete selected portions of stored data in the data storage area that have not been retrieved for a predetermined length of time.

9. A method comprising:
at a first time:
communicating with a first base station using a first communication protocol, first base station identification data uniquely identifying the first base station on a first network;
registering to communicate with a second base station using a second communication protocol different from the first communication protocol when communication with the first base station is no longer possible, second base station identification data uniquely identifying the second base station on a second network; and
upon registering with the second base station, storing data related to the first base station using the second base station identification data as an index, the stored data related to the first base station comprising the first base station identification data; and
at a subsequent time when there is no ongoing communication with either the first base station or the second base station:
registering with the second base station;
using the second base station identification data to recall the data related to the first base station; and
using the recalled data to attempt to communicate with the first base station.

10. The method of claim 9 wherein the first base station identification data comprises a sector identification of the first base station.

11. The method of claim 9 wherein the second base station identification data comprises base station identification and sector identification for the second base station.

12. The method of claim 11 wherein the first base station identification data comprises base station identification and sector identification for the first base station.

13. The method of claim 9 wherein the first and second communication protocols are selected from a group of communication protocols comprising WiMAX, WiFi, CDMA, GSM, 4G, and wCDMA.

14. The method of claim 9, further comprising deleting selected portions of the stored data that have not been retrieved for a predetermined length of time.

15. The method of claim 9, further comprising:
registering to communicate with a third base station using a third communication protocol different from the first communication protocol and the second communication protocol when communication with the first base station and the second base station is not possible;
storing data related to the first base station and data related to the second base station using identification data for the third base station as an index;
at a subsequent time registering with the third base station;
using the identification data for the third base station to recall the data related to the first base station;
using the recalled data related to the first base station to attempt to communicate with the first base station;
if the attempt to communicate with the first base station is not successful, using the identification data for the third base station to recall the data related to the second base station; and
using the recalled data related to the second base station to attempt to communicate with the second base station.

16. A method for use in a wireless device comprising:
communicating with a first base station uniquely identifiable in a first network by first base station identification data;
communicating with a second base station in proximity with the first base station when communication with the first base station is not possible, the second base station being uniquely identifiable in a second network by second base station identification data;
storing communication data related to the first base station using the second base station identification data as an index, the communication data comprising the first base station identification data;
at a subsequent time when the wireless device is not communicating with the first base station or the second base station, beginning communication with the second base station;
after communication with the second base station has begun, using the index to recall the communication data related to the first base station; and using the recalled data to attempt to communicate with the first base station.

17. The method of claim 16 wherein the second base station identification data comprises base station and sector identification data related to the first base station.

18. The method of claim 17 wherein the first base station identification data comprises base station and sector identification data related to the first base station.

19. The method of claim 16, further comprising deleting selected portions of the stored data that have not been retrieved for a predetermined length of time.

20. A method for use in a wireless device comprising:
communicating with a first base station on a first communication link, the first base station being uniquely identifiable in a first network by first base station identification data;
at a time when the first communication link is broken, establishing a second communication link with a second base station, the second base station being uniquely identifiable in a second network by second base station identification data;
storing proximity data related to the first communication link using information from the second communication link as an index, the proximity data associating the first base station identification data with the second base station identification data;
at a subsequent time when the wireless device is not communicating with the first base station or the second base station, re-establishing the second communication link;
using the index to retrieve the stored proximity data related to the first communication link; and
using the retrieved proximity data to attempt to re-establish the first communication link.

21. The method of claim 20 wherein the first base station communicates using a first communication protocol and the second base station communicates using a second communication protocol different from the first communication protocol.

22. The method of claim 21 wherein the first and second communication protocols are selected from a group of communication protocols comprising WiMAX, WiFi, CDMA, GSM, 4G, and wCDMA.

* * * * *